US009405752B2

(12) United States Patent
Collins et al.

(10) Patent No.: US 9,405,752 B2
(45) Date of Patent: Aug. 2, 2016

(54) SYSTEM AND METHOD FOR AUTOMATICALLY PRESENTING A MEDIA FILE ON A MOBILE DEVICE BASED ON RELEVANCE TO A USER

(75) Inventors: Maura Collins, Seattle, WA (US); Valerie Goulart, Seattle, WA (US); Andrea Small, Seattle, WA (US); Sinclair Temple, Seattle, WA (US); Patrick Carney, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 640 days.

(21) Appl. No.: 12/371,523

(22) Filed: Feb. 13, 2009

(65) Prior Publication Data
US 2010/0211575 A1  Aug. 19, 2010

(51) Int. Cl.
G06F 17/30 (2006.01)

(52) U.S. Cl.
CPC .............................. *G06F 17/30044* (2013.01)

(58) Field of Classification Search
CPC .............................................. G06F 17/30044
See application file for complete search history.

(56) References Cited

U.S. PATENT DOCUMENTS

| | | | |
|---|---|---|---|
| 6,941,324 B2 * | 9/2005 | Plastina et al. | |
| 2002/0194246 A1 * | 12/2002 | Moskowitz et al. | 709/102 |
| 2003/0014407 A1 * | 1/2003 | Blatter et al. | 707/6 |
| 2003/0069893 A1 * | 4/2003 | Kanai et al. | 707/104.1 |
| 2003/0117651 A1 * | 6/2003 | Matraszek et al. | 358/1.18 |
| 2005/0250534 A1 * | 11/2005 | Maurer | H04N 1/00108 455/556.1 |
| 2006/0064492 A1 * | 3/2006 | Hirsch | H04L 65/1069 709/227 |
| 2006/0100976 A1 * | 5/2006 | Hsieh | 707/1 |
| 2007/0033210 A1 * | 2/2007 | Baudino et al. | 707/102 |
| 2007/0073937 A1 * | 3/2007 | Feinberg et al. | 710/62 |
| 2007/0101281 A1 * | 5/2007 | Simpson et al. | 715/764 |
| 2008/0240411 A1 * | 10/2008 | Dasgupta | 379/373.04 |
| 2008/0309795 A1 * | 12/2008 | Mitsuhashi et al. | 348/231.99 |
| 2009/0234831 A1 * | 9/2009 | Ebadollahi et al. | 707/5 |
| 2009/0310766 A1 * | 12/2009 | Ye | 379/142.17 |

FOREIGN PATENT DOCUMENTS

| | | |
|---|---|---|
| KR | 100741287 | 7/2007 |
| KR | 20090005668 | 1/2009 |
| WO | WO-02/42864 A2 | 5/2002 |
| WO | WO-2005076156 A1 | 8/2005 |
| WO | WO-2007023994 A1 | 3/2007 |

OTHER PUBLICATIONS

International Search Report and Written Opinion for PCT/US2010/024137 Filed on Feb. 12, 2010, Applicant: T-Mobile USA, Inc., Date of Mailing Sep. 29, 2010, 10 pages.

* cited by examiner

*Primary Examiner* — Rehana Perveen
*Assistant Examiner* — Huen Wong
(74) *Attorney, Agent, or Firm* — Perkins Coie LLP

(57) ABSTRACT

A system and method for automatically presenting a media file on a mobile device based on an analysis of metadata associated with the media file. The system evaluates a media file's metadata to determine whether the media file is relevant to a mobile device user based on time, date, location, subject matter, or other criteria. If the media file is relevant to the user, the system automatically displays the media file on the mobile device. By presenting the media file to a mobile device user, the system reminds the user of fond memories associated with past dates, people, events, or places. In some embodiments, the system may also prompt a user of the mobile device to take an action related to the media file presented on the mobile device, such as prompting the user to place a telephone call to a person pictured in the image.

39 Claims, 5 Drawing Sheets

| File Name | Media Type | File Location | Date Created | Tags | Location | Last Accessed | ... | Other |
|---|---|---|---|---|---|---|---|---|
| Birthday_party.jpg | JPEG Image | C:\pictures\ | 11/16/2008 | Caitlin, sister, birthday, Space Needle | 47.6203, -122.3490 | 06/08/2008 | ... | |
| Jen_dancing.mpg | MPEG Video | \\server1\video\ | 05/02/2007 | Jen, dance | Vancouver, British Columbia | 05/04/2008 | ... | |
| Dad_singing.wav | WAV Audio | A:\music\ | 07/04/2008 | Dad, happy birthday, sing | None | 08/04/2008 | ... | |
| ... | | | | | | ... | ... | ... |

*FIG. 5*

SYSTEM AND METHOD FOR AUTOMATICALLY PRESENTING A MEDIA FILE ON A MOBILE DEVICE BASED ON RELEVANCE TO A USER

BACKGROUND

Mobile devices, such as mobile phones, are ubiquitous in society and have grown in sophistication so that they now provide multiple applications that were previously executed by individual devices. For example, beyond placing telephone calls, a typical mobile phone now allows a user to send text messages and email, surf the internet, listen to music, review pictures and watch video, and capture and send pictures and video. As a result of their widespread use and extensive features, mobile devices allow users to effortlessly capture memories in a photograph or video, share these memories with friends through email or MMS message, and relive moments by browsing a library filled with various types of media.

While a mobile device typically provides an adequate interface to display and enjoy captured media, the problem of old media files is only exacerbated by the passage of time. A user may forget about media files as his or her memory fades. Or a user may lose track of media files as the number of media files that are associated with a user increases. For example, a two-year-old picture of a friend's birthday party may become buried in numerous folders, or a user may simply forget the picture was taken or even the memory associated with it. Thus, while a stored media file may provide a user with an instant and gratifying recollection, the user may remain ungratified as the media file remains undiscovered and unopened.

BRIEF DESCRIPTION OF THE DRAWINGS

FIG. 5 is a representative table such as might be used by the system for organizing media files and metadata associated with the media files.

DETAILED DESCRIPTION

Figure 1:
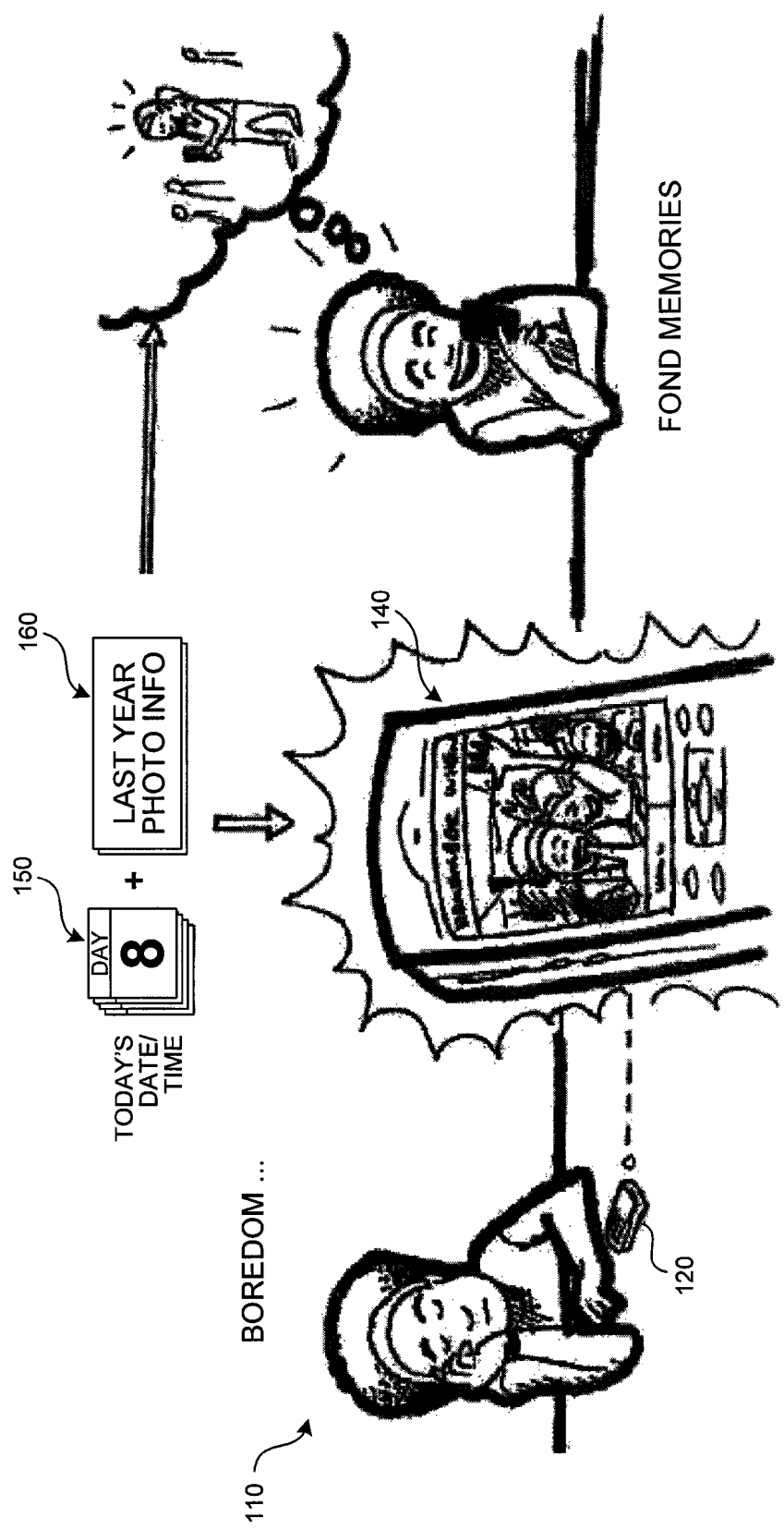
FIG. 1 depicts a representative scenario in which a system selects and presents a relevant media file on a mobile phone based on metadata associated with the media file.

A system and method for automatically presenting a media file on a mobile device based on an analysis of metadata associated with the media file is disclosed. A media file may contain audio content, still picture content, video content, or text content. The metadata (or data about data) associated with a media file describes the contents of the media file or something relating to the media file. For example, an image file may include metadata describing a date the image was captured, a location where the image was captured, and an identity of a person of object pictured in the image. The system evaluates a media file's metadata to determine whether the media file is relevant to a mobile device user based on time, date, subject matter, or other criteria. If the media file is relevant to the user, the system may automatically present the media file on the mobile device. By presenting the media file to a mobile device user, the system reminds the user of important events in the user's life or fond memories associated with past dates, people, events, or places.

In some embodiments, the system may also prompt a user of the mobile device to take an action related to the media file presented on the mobile device. For example, the system may display an image on a mobile phone and prompt the user to place a telephone call to a person pictured in the image or to forward the image. By prompting a user to take action, the system increases the user's enjoyment of the mobile device as it reconnects people over past events. By prompting communication between users, the system may also stimulate network usage of a service provider's network at times when network usage may otherwise be reduced.

In some embodiments, the system may send a message to a related user to cause the mobile device of the related user to present the same media file to the related user as is being presented to the first user. A "related user" is a user that is associated with the media file being presented to the first user on the mobile device, such as being depicted in the media file or being identified in the metadata associated with the media file as the originator of the media file. By causing the mobile device of the related user to present the same media file as is being displayed to the first user at about the same time, the users are able to share in a joint memory.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 depicts a representative scenario in which a system operates on a mobile device 120, such as a mobile phone, to automatically select and present a media file on the phone. In the depicted example, a user 110 sits in relative boredom with her mobile phone nearby. The system automatically selects and displays a picture 140 on the phone's screen that would have historical relevance to the user. The picture 140 is of the user 110 at her friend's birthday party from exactly a year earlier. The next time that the user picks up the mobile phone, she views the picture 140 and remembers her friend and the great time that they had at the party. As the user views the picture, the system may prompt the user to place a call or otherwise contact her friend. Thus, the system not only successfully triggers a fond memory for the user, but it further facilitates communication between friends.

The system did not happen to display a memorable picture to the user at a proper date based on random luck. Rather, the system successfully selected both a relevant image file and a time and date to display the image by analyzing metadata associated with the image file. In the example depicted in FIG. 1, the system searches the mobile device 120 or an account associated with the mobile device for media files that satisfy a search strategy. As will be described in additional detail herein, a search may focus on a particular creation date and time of a media file, one or more tags indicating the subject matter of the media file, or other characteristics of the media file that may suggest relevance to the mobile device user. For example, a search strategy may specify that media files must be created within a particular time or date range. In the example depicted in FIG. 1 the system searches metadata 160 to locate media files that were created on a calendar date that is the same as the present date 150. After performing the search, the system analyzes metadata associated with the media content located by the search to identify those media files that may be of particular relevance or importance to the user. For example, the user may have previously added tags to the picture 140 such as the tags "Jen" and "birthday." The system may therefore select the media file to present to the user, because "birthday" is a special word and "Jen" is contained as an entry in the address book of the mobile phone. Finding high relevance for both the date the image was captured and the tags associated with the image, the system displays the picture 140 on the mobile device 120 at a time and date appropriate for the user 110.

Figure 2:
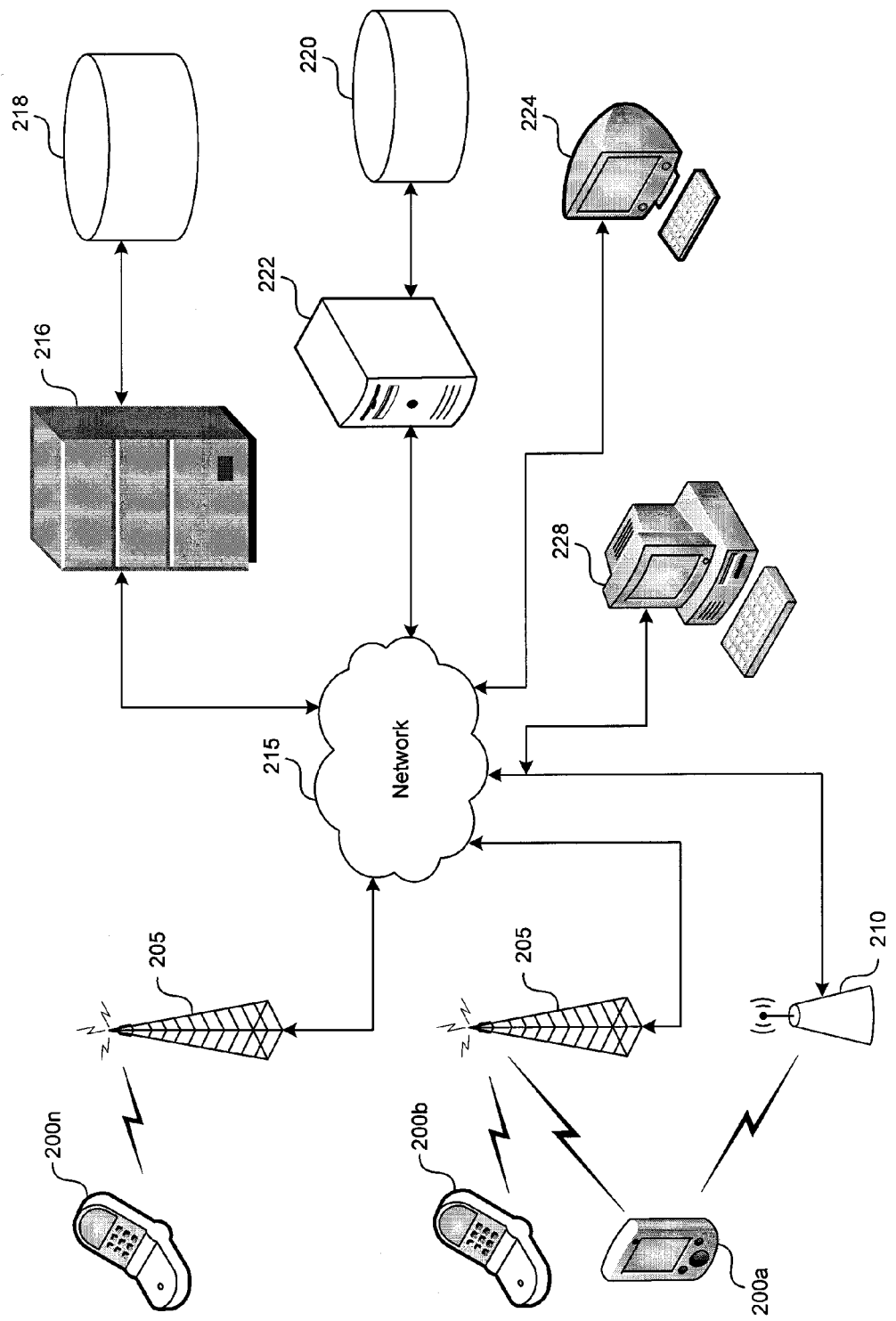
FIG. 2 is a diagram of an environment in which a system that automatically selects and presents a media file on a mobile device operates.

FIG. 2 and the following discussion provide a brief, general description of a suitable environment in which the system can be implemented. Although not required, aspects of the invention are described below in the general context of computer-executable instructions, such as routines executed by a general-purpose data processing device. Those skilled in the relevant art will appreciate that the invention can be practiced in a variety of mobile (handheld or portable) devices, including: mobile telecommunications devices, Internet appliances, personal digital assistants (PDAs), digital music and video players, mobile phones, consumer electronics such as digital picture frames, and the like. Such devices have one or more processors for executing software instructions. Aspects of the invention may be stored or distributed on durable computer-readable media, including magnetically or optically readable computer discs, hard-wired or preprogrammed chips (e.g., EEPROM semiconductor chips), or other durable data storage media.

While aspects of the invention, such as certain functions, are described as being performed exclusively on a single device, the invention can also be practiced in distributed environments where functions or modules are shared among disparate processing devices that are linked through a communications network, such as a Local Area Network (LAN), Wide Area Network (WAN), or the Internet. In a distributed computing environment, program modules may be located in both local and remote memory storage devices and executed by mobile device, server, or other computing device processors.

As shown in FIG. 2, a mobile telecommunications device 200a, 200b . . . 200n, such as a mobile phone, media device, email device, or the like, may communicate with servers or other computing devices via a mobile telecommunications network or other wireless telecommunications network. For example, mobile device 200b may establish a communication channel with a mobile transceiver 205 using any known standard, such as GSM, CDMA, GPRS, EDGE, UMTS, etc. Alternatively or additionally, mobile device 200a may establish a communication channel via a wireless local area network (WLAN) using a wireless hotspot or access point 210. The wireless access point 210 may use any known wireless communication protocols, such as IEEE 802.11 or IEEE 802.16. The mobile device may communicate with the access point 210 using the Unlicensed Mobile Access (UMA) or the Generic Access network (GAN) protocol. The mobile transceivers and access points are connected via public and/or private networks 215 to remote services operating on servers and other computing devices.

Media files and associated metadata that are searched by the system may be stored locally on the mobile device 200 or at a network location that is associated with the mobile device. For example, media files and metadata used by the system may be stored in a database 218 associated with a web server 216, in a third party database 220 associated with a third party web server 222, in a personal computer 224, in a third party computer 228, or in another mobile device 200. The media files and metadata may be transmitted wirelessly to a mobile device 200 via the access point 210 or mobile transceiver 205. The system may also transmit and receive search queries and results via the access point 210 and mobile transceiver 205 to and from network devices. As a result, the disclosed system may identify relevant media files from both local (on the mobile device) and remote (in networked storage or from a service) locations.

Figure 3:
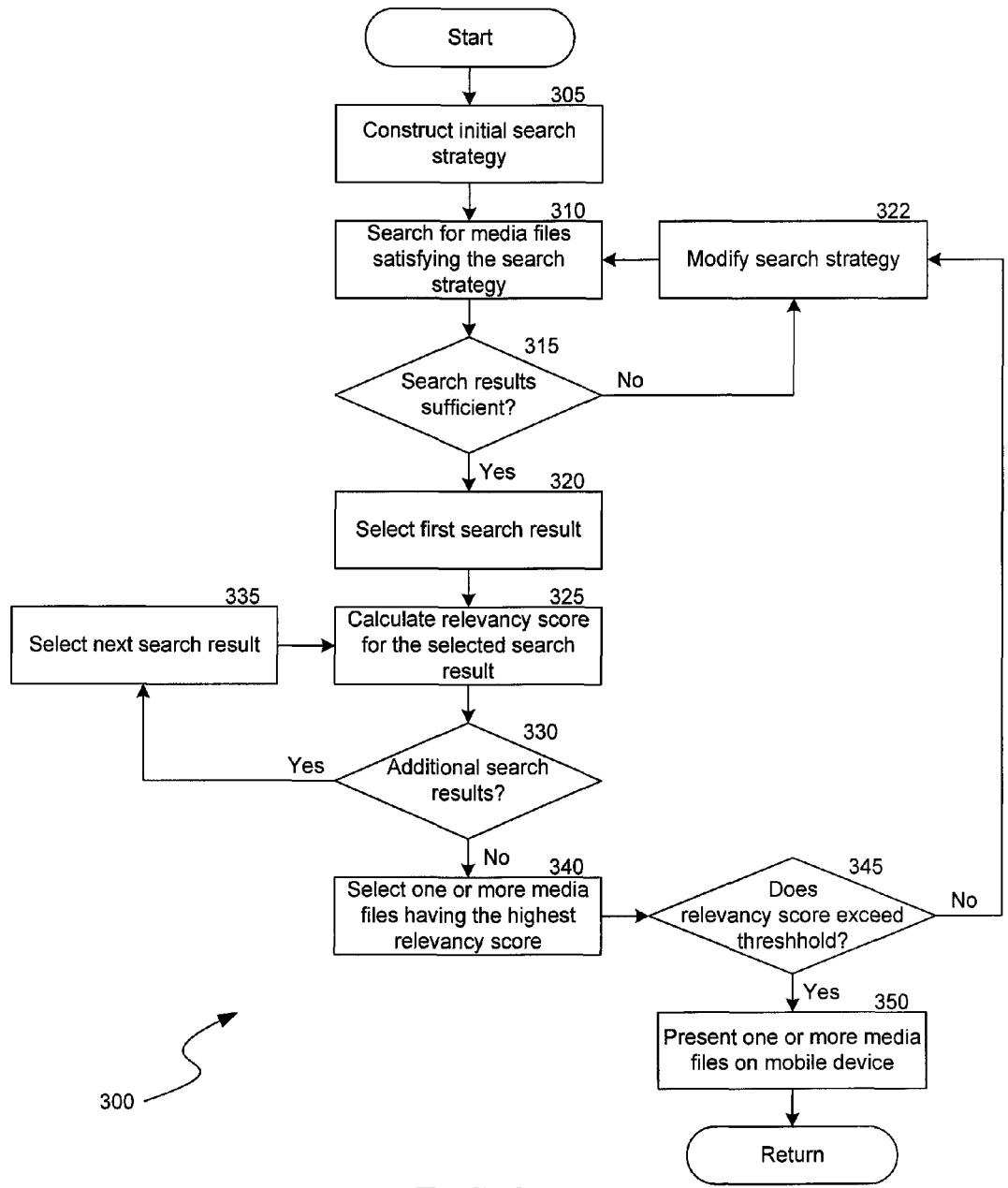
FIG. 3 is a flow chart of a process implemented by the system for selecting a media file to automatically present on a mobile device.

FIG. 3 is a flow chart of a process 300 implemented by the system to automatically select one or more media files to present on a mobile device. At a block 305, the system constructs an initial search strategy. The initial search strategy constructed by the system typically specifies a media type (e.g., a song, a picture, a video) and a date range. For example, an initial search strategy might be to look for any pictures that were created on or within one week of today's calendar date in any preceding year. As another example, an initial search strategy might be to look for any song that was last played by the user exactly six months ago. Those skilled in the art will appreciate that the initial search strategy may be tailored depending on the number of media files to search and the available timeframe for producing search results.

At a block 310, the system searches for available media files that satisfy the search strategy. The system may search for media files stored locally in the mobile device (e.g. stored in flash memory or in a hard or optical drive) or stored remotely (e.g., such as in storage areas accessible via a network-accessible server, computer, or other mobile device). The media files may be stored in an organized fashion (e.g., database, a media-sharing service accessible via an API) or an unorganized fashion. For example, the system may use appropriate APIs to search for media files located in a social networking account, such as a Facebook, Flikr, or MySpace account.

In addition to locating media files that satisfy the search strategy, the system gathers metadata that is associated with the located media files. Metadata associated with a media file may include any data describing the media file or related to the media file. Metadata is typically, although not exclusively, associated with a media file by a system that works in conjunction with the media file or by a user of a media file. As an example, when a user views an image file using photo management software, the photo management software may automatically update the image file's metadata to indicate when the file was last accessed. As another example, a user or a friend of a user may add tags, such as "birthday" or "baseball," to an image of a birthday party at a baseball game. Metadata may also include a date the image was captured, a location where the image was captured, and an identity of a person of object pictured in the image. Metadata may be stored as part of the media file or in a separate file. The system may therefore search for metadata in the same or different locations as it searched for available media files. In some embodiments, the system may analyze metadata to generate more relevant metadata. The system may also analyze a media file to generate metadata. For example, the system may include facial recognition software that would allow it to recognize individuals in a picture or video and automatically tag the picture or video with the names of the recognized individuals.

At a decision block 315, the system determines whether sufficient media files were located as a result of the initial search strategy. If few or no search results were located using the initial search strategy, processing continues to a block 322 where the search strategy is modified before repeating the search at block 310. For example, if an initial search for media files that were created on a certain calendar date did not locate any files, the search strategy may be modified to search for any files that were created within a week of the certain calendar date. If, however, the system determines at decision block 315 that sufficient media files were located by the initial search strategy, processing continues to a block 320.

In an effort to present a media file on the mobile device that a user finds appropriate and relevant, the system selects one or more preferred media files from the search results by analyzing the metadata associated with the media files. The system may analyze metadata using a number of methods. In some embodiments, the system evaluates metadata by computing a relevancy score for each located media file. As will be described in additional detail herein, the system evaluates the metadata associated with a media file to determine how closely the metadata indicates the media file satisfies various relevance criteria selected by the system. The higher the relevancy score calculated by the system, the greater the likelihood that a user will be pleased if the media file is presented on the mobile device. Thus, when presenting a media file, the system generally selects a media file having a highest relevancy score available.

At a block 320, the system selects the first media file search result. At a block 325, the system calculates a relevancy score for the selected search result. To calculate the relevancy score, the system evaluates a selected media file in light of one or more of the following criteria and assigns a score based on each criteria:

Time and Date. The system may evaluate date or time metadata associated with a media file and compare the date or time to assess how close the date or time is to a desired date or time. The date or time associated with a media file may pertain to the date the media file was created, the last time the file was accessed, the last time the file was stored, the last time the file was shared with another user, the last time the file was tagged, or any other date or time applicable to the file. In some embodiments, the system compares date-related metadata to a present date and time. If, for example, metadata indicates that a media file was created almost exactly a year earlier, the system may assign a high date-related criteria score.

The score may increase as an anniversary of a media file's creation date approaches. Conversely, if metadata indicates that a media file was created within the last week, the system may assign a low date-related criteria score. As another example, the system may search for media files that were created in the same season (e.g. summer, fall) as the current season, but in previous years. In addition to or in lieu of date information, the system may compare the present time and identify media files that were created in the past at the same time. For example, if a picture was taken at 3:38 am, the system may identify other pictures that were taken at or around 3:38 am and assign a high time-related criteria score to the pictures.

Tags. The system may analyze tags associated with a media file and may compare the tags to known words or phrases which suggest importance or relevance. For example, an image file may be associated with the tags: "Caitlin," "sister," "birthday," and "Space Needle." Since a "birthday" is a special event and the tag "sister" suggests an important relationship, the system may assign a high tag-related criteria score. The system may also search an address book or similar stored list to assess the relevance of a tag. For example, the system may search the mobile device's address book and, upon finding an entry for "Caitlin," assign a high tag-related criteria score since the presence of "Caitlin" in the address book suggests a relationship with the user. In some embodiments, the system compares tags to data or other information found on the Internet or in a network database, to text from an email or a text message that has been sent, drafted or received via the mobile device, or to text from a document to assess the relevancy of the tags. In some embodiments, the system assigns a higher value to tags that are correlated to events in a user's calendar, event planner, or another type of schedule. If, for example, the user has on his/her schedule that they will attend a baseball game today, the system may assign a high tag-related criteria score to a media file having a tag "Mariners baseball game." In some embodiments, metadata associated with a media file may disclose the identity of the user that added a tag. When the tag author is disclosed, the system may assign greater value to a user-created tag than to a tag added by a third party. Moreover, the system may apply a different score to each tag depending on the strength or importance of the relationship or event that the tag suggests. For example, a general tag of "family" may be worth 3 points, tags of close family members such as "mom," "grandma," etc. may be worth 6 points, and tags of more remote family members such as "cousin" may be worth 4 points. As another example, a tag of "wedding" or "anniversary" may receive a higher score than a tag of "camping." As still another example, a media file that is tagged as containing an individual that is a preferred contact of the user (e.g., is in the user's contacts list or is selected as a member of a preferred service plan such as myFaves® by T-Mobile) may receive a higher score than other tagged individuals. By maintaining a hierarchy of tags and assigning points to a tag that correspond to the tag's position within the hierarchy, the system is able to value certain tags more highly than other tags.

Location. In some embodiments, tags or other metadata may describe a location associated with a media file. For example, a GPS or another positioning system may associate a longitude and latitude with a media file when the media file is created. The system may rate a media file as being very relevant when the location specified by the tag or other metadata indicates that the media file is related to a current position of a mobile device. In such an embodiment, the system may utilize GPS, triangulation of cell towers, an IP address, or another positioning system or data indicating a location to monitor a physical location of a mobile device. Media files having locations that are closer to the physical location of a mobile device may be assigned a higher location-related criteria score than media files having metadata indicating a location far away from the mobile device. Furthermore, in some embodiments, the system may evaluate a user-created tag describing a location or place by searching the Internet or elsewhere to find coordinates for the location or place and by comparing the coordinates to a physical location of a mobile device. For example, an image file stored in a mobile device may be associated with a tag "Space Needle." The system may search the Internet and discover a latitude and longitude for the Space Needle. The system may thereafter monitor a physical location of the mobile device using a GPS or another positioning system, generating a higher location-related criteria score the closer the device moves to the Space Needle.

Prior Use. The system may evaluate a frequency of use of a media file to assess how popular the media file is to the user or to other parties, and assign a higher use-related criteria score to more popular media files. Use-related metadata may include statistics or other data describing how or when a user has used the media file. Thus, use-related metadata may include, for example, a frequency that a user accesses a media file, a total number of times the user or other users have accessed a file, whether or how many times a file has been printed, or whether or how many times a file has been sent to another person via email or MMS message. Other use-related metadata may include a length of time a user has accessed a media file, whether a user has selected a media file as a screen saver or wallpaper, whether a user has burned a media file to a CD or other disk, whether a user has copied a media file, whether the media file was received via a message and subsequently stored by the user on the mobile device, or whether the system has previously presented a media file on a mobile device and the user has taken action based on the previously-presented media. The system may score some use-related metadata higher than other use-related metadata. For example, metadata indicating that an image has been printed may be scored highly because a user who prints an image usually finds the image appealing. However, metadata indicating that an image was previously viewed earlier in a day may receive a low score, as a user would likely not want to view the same image again soon. The system may also decrement or reduce the score as a result of certain activities. For example, a user that viewed and deleted a local copy of an image may cause the system to apply a zero or negative use-related criteria score to other copies of the image.

Express Rating. The system may evaluate metadata indicating that the user has expressly assigned a high value to a media file, such as by rating or assigning a score to the media file. If the metadata indicates that the user has assigned a high value to a media file (e.g. a five star rating out of five), the system may assign a high rating-related criteria score to the media file. Conversely, if the metadata indicates that the user has assigned a low value to a media file (e.g., a one star rating), the system may assign a low rating-related criteria score to the media file. The rating assigned to the media file and considered by the system may be generated by a user, by a friend or family of the user, or by a group of individuals (e.g., a media file rated by members of a social networking site).

Collections. The system may evaluate metadata indicating that a media file is part of a collection of media files associated with a common event or a particular timeframe. For example, a set of media files may be associated with a wedding or a holiday such as Thanksgiving. As another example, a set of media files may have been captured by a user within a 10 minute time span. The system may assign a high collections-related criteria score to a media file that is part of a collection, on the basis that multiple media files associated with an event or a particular timeframe will suggest a greater importance to a user than a single media file that was captured or stored by the user.

At block 325, the system computes the media file's relevancy score by adding each of the criteria scores that were evaluated by the system. The criteria scores may be added so that each criteria score receives equal weight, or weighting factors may be applied to the criteria scores so that certain criteria receive greater weight than other criteria. For example, the system may rate date-related metadata higher than that of the tag-related metadata, and tag-related metadata higher than that of use-related metadata. This weighting reflects an assumption that a media file's date-related metadata best anticipates a user's reception to a media file, followed by the tag-related metadata and use-related metadata. The following equation is a general algorithm that may be used by the system to calculate the relevancy score for a media file:

$$relevancyscore = (\alpha_1 * datescore) + (\alpha_2 * timescore) + (\alpha_3 * tagscore) + (\alpha_4 * locationscore) + (\alpha_5 * usescore) + (\alpha_6 * ratingscore) + (\alpha_7 * collectionscore)$$

Where $\alpha_1$-$\alpha_8$ are the weights applied by the system to each of the individual criteria scores. After calculating the media file's relevancy score, the system stores the relevancy score in association with the media file.

At a decision block 330, the system determines whether another media file is available to evaluate. If another media file is available to evaluate, the system loops back to block 335 to select the next search result and then to block 325 in order to evaluate the next media file. If no additional media file is available to evaluate at decision block 330, the system proceeds to block 340. At this point, the system has scored all of the media files identified in the search results in light of the applicable criteria at the time of analysis.

At block 340, the system selects one or more media files having the highest relevancy score from the media files identified by the search. The media files having the highest relevancy scores are presumed to be of the highest relevance or interest to the user. At decision block 345, the system analyzes whether the selected media files have a relevancy score above a threshold value. If no media file has a relevancy score above the threshold value, the system loops back to block 322 to modify the search strategy and search for additional media files. If at least one media file has a relevancy score above the threshold value, the system proceeds to a block 350. At block 390, the system presents on the mobile device one or more media files having a highest relevancy score above the threshold value. By selecting only those media files have a relevancy score above a threshold value, the system tries to ensure that the presented media files will be highly relevant to the user.

If presenting more than one media file to the user at block 390, the system may present media files that are unrelated to each other or may present media files that are related to each other. For example, the system may select a sequence of media files that all are associated with a common event and which exceed the threshold value. When presenting the media files to the user, the system may automatically step through the sequence of media files or may allow the user to manually step through the sequence of media files. If presented to the user automatically, the system may step through the media files based on time, distance, or other metric. For example, if the media files are pictures, the system may display each picture for 15 seconds before switching to the next picture. As another example, as the user approaches the Seattle Space Needle, the system may present a series of media files that relate to the Space Needle and may present a different media file as user moves closer to the Space Needle. When presenting sets of media files, not all of the media files need to be of the same format. For example, the system might display three pictures, then a video, then play a song to the user, before displaying a few more pictures.

While the previous description details a scoring system that involves analyzing metadata to rate a media file based on several criteria, one skilled in the art will appreciate that a media file and its associated metadata may be evaluated in a variety ways. For example, rather than assign a score to each metadata criteria, the system may apply a binary analysis to determine whether the criteria is satisfied or not satisfied. An analysis may be based on one criteria, several criteria, or all criteria. In addition, criteria not disclosed herein may also be used in the analysis.

The selection process 300 may be repeated by the system on a periodic basis, such as on an hourly or daily basis, or may be repeated on an ad-hoc basis. For example, the system may repeat the selection process 300 when a mobile device is not being used by a user. Additionally or alternatively, the system may continuously monitor or search for and select available media files. The selection process may also be triggered based on a location, proximity to another individual or object, or other event. For example, the system may automatically initiate a selection process if a mobile device is physically located within a certain distance of a location. As another example, the system may automatically initiate a selection process if a mobile device is physically located within a certain proximity to a person. When triggered by a location or person, the initial search strategy may be tailored to identify media files associated with that location or person, and metadata indicating that a media file is associated with that location or person may we weighted more heavily when selecting which media file to present to the user.

The system may present media files that are identified by the selection process 300 more frequently or less frequently than it completes the selection process. In some embodiments, the system automatically presents one or more media files on a mobile device upon the completion of the selection process. In some embodiments, the system does not automatically present a media file and instead queues media files to present in a certain order or at a certain date, time, event, or when another condition is met. For example, the system may determine that a user would find a particular media file most relevant on a certain date, such as one day before the anniversary of the media file's creation. The system may wait until that day to present the media file. The system may accomplish such a feat by, for example, pre-calculating the date, time, or event that would result in the media file receiving the highest possible relevancy score. In some embodiments, the system may not present a media file until a mobile device is in a certain state of action or inaction. For example, the system may wait until the mobile device is awoken from a hibernation mode before presenting a media file to a user, or may wait until the mobile device has entered a period of inactivity (e.g., periods when the user may be bored). In some embodiments, the system automatically presents a media file when a third party tags or comments on the media file. For example, the system may monitor a Facebook page or other social networking service. If, for example, a third party comments on a picture or tags the picture, the system may automatically display the picture on the mobile device to alert a user of this activity.

Figure 4C:
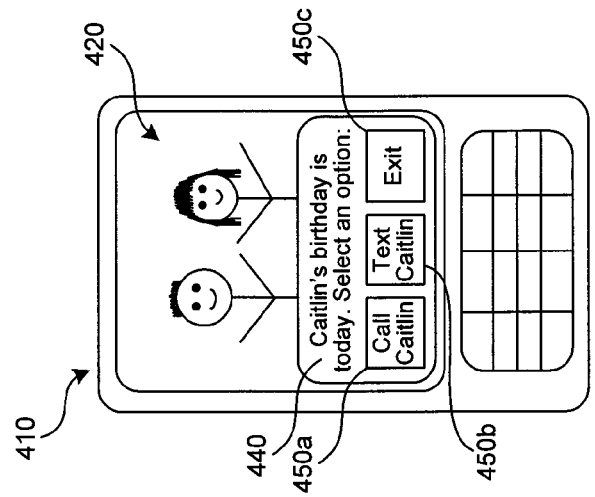
FIGS. 4A-4C are screen shots of representative interfaces that are displayed on a mobile device by the system when the system presents a media file on the mobile device.
Figure 4B:
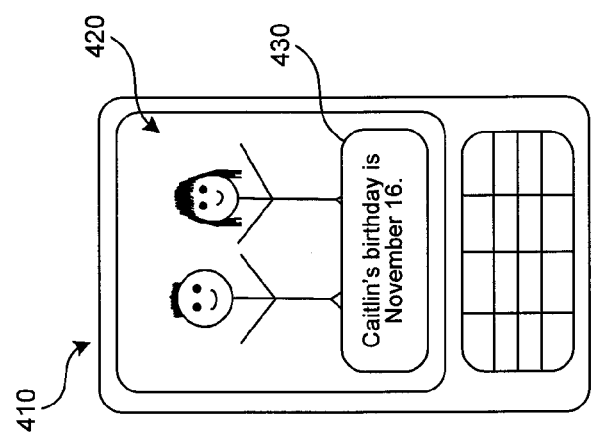
Figure 4A:
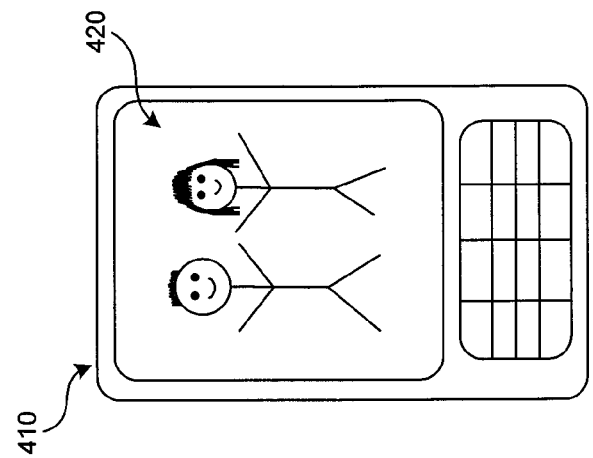

In addition to presenting a media file to a user, the system may also present one or more options for a user to take action with respect to the media file. FIGS. 4A-4C are screen shots of representative interfaces that may be displayed on a mobile device by the system when the system presents a media file on the mobile device. In FIG. 4A, the system displays an image 420 on a mobile device 410 and does not display any additional information or options. Whether or not a user takes action after viewing the image therefore entirely depends on the whims of the user. In contrast, in FIG. 4B the system displays the image 420 and also displays textual information 430 on the mobile device that provides details related to the image. In the example in FIG. 4B, the system displays a reminder to a user about Caitlin's birthday on November 16. The textual information 430 displayed by the system may be derived from metadata associated with an image file or based on other data, such as data from a calendar or event planner, data from a social networking website, or data from an address book. In the depicted example, the system may display the textual information 430 regarding Caitlin's birthday because the image is tagged with "Caitlin" and a calendar of the user indicates that Caitlin's birthday is on November 16.

In FIG. 4C, the system again displays the image 420 and a reminder 440 on the mobile device 410. However, the system also displays three option buttons 450a, 450b, and 450c that are associated with the image. In the example depicted in FIG. 4C, the image is tagged with "Caitlin" and the system has discovered on the user's calendar that it is Caitlin's birthday. The system has also discovered an entry for "Caitlin" in an address book and a phone number for Caitlin. As a result, the system displays a first option button 450a to call Caitlin, a second option button 450b to text or MMS message Caitlin, and a third option button 450c to remove the information 440 and options from the mobile phone display. A fourth option button (not shown) may allow the user to see additional media files that are associated with Caitlin. If the user selects the first option 450a to call Caitlin, the mobile phone places a call to Caitlin using the associated phone number. Similarly, if the user selects the second option 450b to text message Caitlin, the mobile phone proceeds to display a text or MMS message screen with Caitlin's address pre-filled. When generating a text, MMS, or email message, the system may prompt or otherwise encourage the user to attach the displayed media file with the email or MMS message. One skilled in the art will appreciate that the depicted options are only representative and the system may display any option on a mobile device along with a media file. For example, in some embodiments, the system may display an image and an option that says, "Do you want to place a call?" or "Do you want to search the Internet for more information regarding this image?" As another example, the system may allow a user to send a voice note to the depicted individual or to poke the depicted individual.

In addition to or in lieu of allowing a user to take action with respect to a presented media file, the system may automatically take action on the presented media file. The system may send a message to a related user that is tagged as being depicted in the presented media file or is otherwise identified with the media file (e.g., the related user is the originator of the media file). The message may contain the media file or may contain a pointer or path to the media file. When the message is received by a mobile device of the related user, the mobile device of the related user utilizes the information about the media file to retrieve and present the media file to the related user. The media file may be presented to the related user in a similar fashion in which it is presented to the first user. By causing the mobile device of the related user to present the same media file as is being displayed to the first user at about the same time, the users are able to share in a joint memory. The related user may thereby be incentivized to contact the first user.

In some embodiments, the system presents two or more media files simultaneously or sequentially. For example, the system may present a series of photos that were associated with an event. As another example, the system may display an image file and play a music file that that was popular at the time the image file was created. As still another example, the system may play a music file that a user has recently downloaded while the system displays an image on a mobile device. In some embodiments, the system may search the Internet or elsewhere for a media file associated with a displayed media file. For example, a music file may include a tag of "Bob Dylan" and "Concert." The system may play the music file and display an image of Bob Dylan that the system downloaded from the Internet. In some embodiments, the system uses music recognition software to identify a captured music file. The system may tag the music file with data associated with an identified song. Similarly, the system may tag an associated video file or image file with data associated with an identified song.

Once a media file and associated metadata are located by the system, the system may store the media file and the metadata in a manner that is accessible and actionable by the system. FIG. 5 depicts a representative table 500 showing media files located by the system and metadata associated with the media files. Each row 505 in the table represents a media file, and each column in the table contains metadata characterizing or associated with each media file. It will be appreciated that more rows 505 may be added to the table, or rows may be removed from the table, if the system locates an additional media file or if a media file is deleted or removed from the system. A first column 510 contains a file name of each of the media files (as depicted, "Birthday_party.jpg," "Jen_dancing.mpg," and "Dad_singing.wav"). A second column 515 is used to store a type of each media file. For example, Birthday_party.jpg is a JPEG Image file. A third column 520 is used to store a location of the media file. For example, Birthday_party.jpg is stored in C:\pictures\, and Jen_dancing.mpg is stored in \\server1video\. A fourth column 525 is used to store a creation date of the media file. For example, Birthday_party.jpg was created on Jun. 8, 2008 and Jen_dancing.mpg was created on May 2, 2007. A fifth column 530 is used to store tags associated with a media file. For example, tags associated with birthday_party.jpg include "Caitlin," "sister," "birthday," and "Space Needle." A sixth column 535 is used to store location-related metadata associated with a media file. For example, metadata associated with Birthday_party.jpg includes latitude and longitude of 47.6203, −122.3490, and metadata associated with Jen_dancing.mpg includes the city of Vancouver, British Columbia. A seventh column 540 is used to store a date that a media file was last accessed. For example, the media file Dad_singing.wav was last accessed on Aug. 4, 2008. It will be appreciated that additional metadata characterizing or associated with each media file may be added to the table by adding additional columns 545 to the table.

By presenting the media file to a mobile device user, the system reminds the user of important events in the user's life or fond memories associated with past dates, people, events, or places, and by prompting a user to take action, the system increases the user's enjoyment of the mobile device as it reconnects people over past events. The disclosed system therefore reconnects mobile device users with friends and family in a fun an unobtrusive manner.

By prompting communication between users, one of the side effects of the system is that it may stimulate network usage of a service provider's network. For example, users may be more likely to make calls or send texts or emails after having viewed a photo or a video, or listened to a song from a past event. Because the system may stimulate network traffic, a system operator may elect for the system to be operational only at times when network usage is otherwise low. For example, the system may only operate on weekends or after business hours. Alternatively, if a network operator sees a reduction in network traffic, the operator may elect for the system to be operational or to present a greater number of media files in hope of stimulating additional network traffic to cause the network to be more optimally utilized. In some embodiments, a user may be provided with controls to specify when the system is operational and to modify certain parameters of the system's operation, such as where to search and locate media files that are pertinent to the user. Moreover, the user may be provided with controls that allow the user to expressly exclude certain media from consideration by the system. For example, if the user had photos or videos of a family dog that had passed away, the user could opt to exclude all media files that were tagged with the name of the family dog in order to avoid being reminded about the loss of the family pet.

From the foregoing, it will be appreciated that specific embodiments of the invention have been described herein for purposes of illustration, but that various modifications may be made without deviating from the spirit and scope of the invention. For example, while FIG. 5 shows a table whose contents and organization are designed to make them more comprehensible by a human reader, those skilled in the art will appreciate that actual data structures used by the system to store this information may differ from the table shown, in that they, for example, may be organized in a different manner, may contain more or less information than shown, may be compressed and/or encrypted, etc. As another example, the blocks shown in FIG. 3 may be altered in a variety of ways. The order of the blocks may be rearranged, blocks may be performed in parallel, blocks may be omitted, or other blocks may be included. Accordingly, the invention is not limited except as by the appended claims.

We claim:

1. A computer-implemented method of identifying a media file that is relevant to a user of a first mobile device and presenting the media file to the user of the first mobile device and a user of a second mobile device, the method comprising:
automatically formulating a search query to identify a plurality of media files that are relevant to a user of a first mobile device,
wherein the search query includes a temporal limitation to seek only media files having an associated month and day that are equal to the present month and day, but have a different year than the present year, and
wherein the search query is formulated without receiving user search criteria;
applying the search query to stored media files to identify a plurality of media files that satisfy the search query,
wherein each of the plurality of media files have associated metadata that characterizes the media file;
determining for each of the identified plurality of media files a relevancy score that reflects a relevance of the associated media file to the user of the first mobile device,
wherein the relevancy score is based on two or more criteria and determined by:
calculating, for each of the two or more criteria, an individual criteria score that is higher for identified media files having greater relevance to the user of the first mobile device and lower for identified media files having less relevance to the user of the first mobile device; and
summing the two or more individual criteria scores to determine the relevancy score;

selecting only a single one of the identified plurality of media files to present to the user of the first mobile device and the user of the second mobile device, wherein the single selected media file has the highest determined relevancy score;

automatically presenting the single selected media file to the user of the mobile device; and sending a message to the second mobile device to cause the selected media file to be presented to the user of the second mobile device.

2. The computer-implemented method of claim 1, further comprising presenting to the user of the mobile device an option to take an action in conjunction with the presentation of the single selected media file.

3. The computer-implemented method of claim 2, wherein the action is selected from the group consisting of sending a textual message, making a phone call, sending a voice note, sending a poke, forwarding the selected media file, or viewing another media file.

4. The computer-implemented method of claim 1, wherein the present month and day corresponds to an anniversary.

5. The computer-implemented method of claim 4, wherein the anniversary is a yearly anniversary.

6. The computer-implemented method of claim 1, wherein a criteria is content of descriptive tags, and the metadata is evaluated to determine whether a descriptive tag associated with a media file is reflective of an event or person.

7. The computer-implemented method of claim 6, wherein the evaluation includes comparison of the descriptive tag with at least one of an address book, a calendar, a playlist, or a note.

8. The computer-implemented method of claim 1, wherein a criteria is location, and the metadata is evaluated to determine whether a location associated with a media file is related to a current physical location of the mobile device.

9. The computer-implemented method of claim 1, wherein a criteria is prior use, and the metadata is evaluated to determine whether an associated media file has been previously used.

10. The computer-implemented method of claim 9, wherein the evaluation to determine whether an associated media file has been previously used further includes evaluating a frequency and a type of use.

11. The computer-implemented method of claim 1, wherein a criteria is rating, and the metadata is evaluated to determine whether an associated media file has been positively rated.

12. The computer-implemented method of claim 1, wherein the media file is selected from the group consisting of a picture file, a video file, an audio file, or a text file.

13. A computing system that identifies a media file that is relevant to a user of a mobile device and automatically presents the media file to the user, the computing system comprising:

an analysis component that is configured to:

automatically formulate a search query to identify a plurality of media files that are relevant to a user of a mobile device, the search query including a temporal limitation to seek only media files having an associated month and day that are equal to the present month and day, but have a different year than the present year, the search query formulated without input from the user;

apply the search query to stored media files to identify a plurality of media files that satisfy the search query, each of the plurality of media files having associated metadata that characterizes the media file;

determine for each of the identified plurality of media files a relevancy score that reflects a relevance of the associated media file to the user, the relevancy score being based on two or more criteria and determined by:

calculating, for each of the two or more criteria, an individual criteria score that is higher for identified media files having greater relevance to the user and lower for identified media files having less relevance to the user; and combining the two or more individual criteria scores to determine the relevancy score;

select only a single one of the identified plurality of media files to present to the user of the mobile device, the single selected media file having the highest determined relevancy score; and a user interface component that is coupled to the analysis component, the user interface component being configured to automatically present the single selected media file to the user of the mobile device.

14. The computing system of claim 13, wherein the user interface component further presents to the user of the mobile device an option to take an action in conjunction with the presentation of the single selected media file.

15. The computing system of claim 14, wherein the action is selected from the group consisting of sending a textual message, making a phone call, sending a voice note, sending a poke, forwarding the selected media file, or viewing another media file.

16. The computing system of claim 13, wherein the present month and day corresponds to an anniversary.

17. The computing system of claim 16, wherein the anniversary is a yearly anniversary.

18. The computing system of claim 13, wherein a criteria is content of descriptive tags, and the metadata is evaluated to determine whether a descriptive tag associated with a media file is reflective of an event or person.

19. The computing system of claim 18, wherein the evaluation includes comparison of the descriptive tag with at least one of an address book, a calendar, a playlist, or a note.

20. The computing system of claim 13, wherein a criteria is location, and the metadata is evaluated to determine whether a location associated with a media file is related to a current physical location of the mobile device.

21. The computing system of claim 13, wherein a criteria is prior use, and the metadata is evaluated to determine whether an associated media file has been previously used.

22. The computing system of claim 21, wherein the evaluation to determine whether an associated media file has been previously used further includes evaluating a frequency and a type of use.

23. The computing system of claim 13, wherein a criteria is rating, and the metadata is evaluated to determine whether an associated media file has been positively rated.

24. The computing system of claim 13, wherein the media file is selected from the group consisting of a picture file, a video file, an audio file, or a text file.

25. The computing system of claim 13, the analysis component further sends a message to another user to cause the selected media file to be presented to the other user on a mobile device.

26. A non-transitory durable computer-readable storage medium comprising instructions for identifying a media file that is relevant to a user of a first mobile device and presenting the media file to the user of the first mobile device and a user of a second mobile device, the instructions, when executed by a processor, cause the processor to:
- automatically formulate a search query to identify a plurality of media files that are relevant to a user of a first mobile device,
  - the search query including a temporal limitation to seek only media files having an associated month and day that are equal to the present month and day, but have a different year than the present year, the search query formulated without input from the user;
- apply the search query to stored media files to identify a plurality of media files that satisfy the search query,
  - each of the plurality of media files having associated metadata that characterizes the media file;
- determine for each of the identified plurality of media files a relevancy score that reflects a relevance of the associated media file to the user of the first mobile device,
  - the relevancy score being based on two or more criteria and determined by:
    - calculating, for each of the two or more criteria, an individual criteria score that is higher for identified media files having greater relevance to the user of the first mobile device and lower for identified media files having less relevance to the user of the first mobile device; and
    - combining the two or more individual criteria scores to determine the relevancy score;
- select only a single one of the identified plurality of media files to present to the user of the first mobile device and the user of the second mobile device,
  - the single selected media file having the highest determined relevancy score;
- automatically resent the single selected media file to the user of the mobile device; and
- send a message to the second mobile device to cause the selected media file to be presented to the user of the second mobile device.

27. The non-transitory durable computer-readable storage medium of claim 26, further comprising instructions that, when executed by a processor, cause the processor to:
- present to the user of the mobile device an option to take an action in conjunction with the presentation of the single selected media file.

28. The non-transitory durable computer-readable storage medium of claim 27, wherein the action is selected from the group consisting of sending a textual message, making a phone call, sending a voice note, sending a poke, forwarding the selected media file, or viewing another media file.

29. The non-transitory durable computer-readable storage medium of claim 26, wherein the present month and day corresponds to an anniversary.

30. The non-transitory durable computer-readable storage medium of claim 29, wherein the anniversary is a yearly anniversary.

31. The non-transitory durable computer-readable storage medium of claim 26, wherein a criteria is content of descriptive tags, and the metadata is evaluated to determine whether a descriptive tag associated with a media file is reflective of an event or person.

32. The non-transitory durable computer-readable storage medium of claim 31, wherein the evaluation includes comparison of the descriptive tag with at least one of an address book, a calendar, a playlist, or a note.

33. The non-transitory durable computer-readable storage medium of claim 26, wherein a criteria is location, and the metadata is evaluated to determine whether a location associated with a media file is related to a current physical location of the mobile device.

34. The non-transitory durable computer-readable storage medium of claim 26, wherein a criteria is prior use, and the metadata is evaluated to determine whether an associated media file has been previously used.

35. The non-transitory durable computer-readable storage medium of claim 34, wherein the evaluation to determine whether an associated media file has been previously used further includes evaluating a frequency and a type of use.

36. The non-transitory durable computer-readable storage medium of claim 26, wherein a criteria is rating, and the metadata is evaluated to determine whether an associated media file has been positively rated.

37. The non-transitory durable computer-readable storage medium of claim 26, wherein the media file is selected from the group consisting of a picture file, a video file, an audio file, or a text file.

38. The computer-implemented method of claim 1, wherein the selected media file is related to the user of the second mobile device.

39. The non-transitory durable computer-readable storage medium of claim 26, wherein the selected media file is related to the user of the second mobile device.

* * * * *